United States Patent
Arai (10) Patent No.: US 10,460,646 B2
(45) Date of Patent: Oct. 29, 2019

(54) DISPLAY SYSTEM, DISPLAY DEVICE, ELECTRONIC APPARATUS, AND IMAGE SIGNAL TRANSMISSION METHOD FOR DISPLAYING AN ORIGINAL IMAGE BASED ON COMBINING DIVIDED IMAGE SIGNALS

(71) Applicant: NEC Display Solutions, Ltd., Tokyo (JP)

(72) Inventor: Yutaka Arai, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 195 days.

(21) Appl. No.: 15/535,787

(22) PCT Filed: Jan. 21, 2015

(86) PCT No.: PCT/JP2015/051515
§ 371 (c)(1),
(2) Date: Jun. 14, 2017

(87) PCT Pub. No.: WO2016/117052
PCT Pub. Date: Jul. 28, 2016

(65) Prior Publication Data
US 2017/0352307 A1 Dec. 7, 2017

(51) Int. Cl.
*G09G 3/20* (2006.01)
*G06F 3/14* (2006.01)
(Continued)

(52) U.S. Cl.
CPC ......... *G09G 3/2092* (2013.01); *G06F 3/1446* (2013.01); *G09G 5/003* (2013.01);
(Continued)

(58) Field of Classification Search
CPC ...... G09G 3/2092; G09G 5/003; G09G 5/393; G06F 3/1446
See application file for complete search history.

(56) References Cited

U.S. PATENT DOCUMENTS

2006/0093044 A1* 5/2006 Grantham ............. G06F 3/1446
375/240.28
2006/0267990 A1 11/2006 Rogers et al.
(Continued)

FOREIGN PATENT DOCUMENTS

CN        1848216 A    10/2006
CN    101800029 A     8/2010
(Continued)

OTHER PUBLICATIONS

Japanese Decision to Grant a Patent, dated Dec. 4, 2018, in Japanese Application No. 2016-570398 and English Translation thereof.
(Continued)

*Primary Examiner* — King Y Poon
*Assistant Examiner* — Vincent Peren
(74) *Attorney, Agent, or Firm* — McGinn I. P. Law Group, PLLC.

(57) ABSTRACT

A display system that can solve the problem of an inadequate band in a connector or transmission path and that enables processing of a high-resolution image signal, includes a display device and an electronic apparatus that is electrically connected to the display device via a connector. The electronic apparatus receives or generates an original image signal indicating an original image that is to be displayed and supplies a plurality of divided image signals each indicating a respective image of a plurality of partial images into which the original image has been divided. The display device displays the original image on the basis of a combined image signal into which the plurality of partial image signals supplied from the electronic apparatus have been combined.

16 Claims, 6 Drawing Sheets

(51) Int. Cl.
  *G09G 5/00* (2006.01)
  *G09G 5/393* (2006.01)
  *G09G 5/18* (2006.01)

(52) U.S. Cl.
  CPC ............... *G09G 5/393* (2013.01); *G09G 5/18* (2013.01); *G09G 2310/08* (2013.01); *G09G 2340/04* (2013.01); *G09G 2340/10* (2013.01); *G09G 2340/12* (2013.01); *G09G 2340/16* (2013.01); *G09G 2360/02* (2013.01); *G09G 2360/12* (2013.01); *G09G 2370/10* (2013.01); *G09G 2370/12* (2013.01)

(56) References Cited

U.S. PATENT DOCUMENTS

| | | | | |
|---|---|---|---|---|
| 2009/0079760 | A1* | 3/2009 | Tu | G09G 5/42 |
| | | | | 345/619 |
| 2010/0033627 | A1* | 2/2010 | Hayashi | G09G 5/005 |
| | | | | 348/500 |
| 2014/0071169 | A1* | 3/2014 | Chang | G06T 3/4092 |
| | | | | 345/660 |
| 2014/0205024 | A1* | 7/2014 | Toba | H04N 21/43635 |
| | | | | 375/240.28 |
| 2014/0211094 | A1* | 7/2014 | Minamoto | H04N 5/38 |
| | | | | 348/723 |
| 2014/0362295 | A1* | 12/2014 | Suzuki | G09G 5/003 |
| | | | | 348/564 |
| 2015/0002739 | A1* | 1/2015 | Rui | H04N 21/43635 |
| | | | | 348/441 |
| 2015/0015794 | A1* | 1/2015 | Matsunaga | H04N 5/63 |
| | | | | 348/730 |
| 2015/0332431 | A1* | 11/2015 | Tsuchida | H04N 5/23293 |
| | | | | 345/660 |
| 2015/0332432 | A1* | 11/2015 | Tsuchida | G09G 5/12 |
| | | | | 345/660 |

FOREIGN PATENT DOCUMENTS

| | | |
|---|---|---|
| CN | 102957842 A | 3/2013 |
| JP | H 05-158576 A | 6/1993 |
| JP | H 10-124037 A | 5/1998 |
| JP | H 11-119722 A | 4/1999 |
| JP | 2003-348597 A | 12/2003 |
| JP | 2007-166204 A | 6/2007 |
| JP | 2009-168947 A | 7/2009 |
| JP | 2011-066532 A | 3/2011 |
| JP | 2014-003438 A | 1/2014 |
| JP | 2014-003488 A | 1/2014 |
| JP | 2014-134755 A | 7/2014 |
| WO | WO 2012/114483 A1 | 8/2012 |

OTHER PUBLICATIONS

Chinese Office Action, dated Dec. 26, 2018, in Chinese Application No. 201580074065.3 and English Translation thereof.
International Search Report (ISR) (PCT Form PCT/ISA/210), in PCT/JP2015/051515, dated Apr. 21, 2015.

* cited by examiner

DISPLAY SYSTEM, DISPLAY DEVICE, ELECTRONIC APPARATUS, AND IMAGE SIGNAL TRANSMISSION METHOD FOR DISPLAYING AN ORIGINAL IMAGE BASED ON COMBINING DIVIDED IMAGE SIGNALS

TECHNICAL FIELD

The present invention relates to a display device such as a liquid crystal display, an electronic apparatus such as an option board that is inserted into a display device, a display system that is provided with a display device and electronic apparatus, and an image signal transmission method.

BACKGROUND ART

Recent display devices (in particularly, large-scale display devices) are provided with option slots for expanding interfaces and increasing functions. Option boards provided with a variety of functions are offered, and users are able to insert option boards provided with desired functions into the option slots. Some option boards are also provided with the functions of a signal-generating device such as a media player or personal computer.

An option board that has been inserted into an option slot is electrically connected to the display device-side board by way of a connector. Taking into consideration the operations of inserting and removing the option board by the user, relatively sturdy and low-density connectors are typically used as the connection between the display device-side board and the option board.

Patent Document 1 discloses a display device that can selectively accommodate the installation of a plurality of types of board apparatuses (option boards). This display device has an apparatus-accommodating slot that can selectively accept first and second board-type apparatuses and a device-side connector that is provided in the innermost portion of the apparatus-accommodating slot. Both first and second board-type apparatuses are provided with apparatus-side connectors, and in the state of being accommodated in the apparatus-accommodating slot, the apparatus-side connector is electrically connected to the device-side connector.

In the above-described display device as well, relatively sturdy and low-density connectors are used for the apparatus-side connector and device-side connector.

LITERATURE OF THE PRIOR ART

Patent Documents

Patent Document 1: Japanese Patent No. 2012/114483

SUMMARY OF THE INVENTION

The display device provided with the above-described option slot and the display device described in Patent Document 1 have the following problems.

With the advance in higher resolution of display devices in recent years, the frequency of signals handled by the option boards has also become higher. On the other hand, the option slot connectors are of a low-density connection structure and thus not compatible with high-frequency signals. As a result, when a high-resolution image signal is transmitted from the option board to the display device-side board by way of the option slot connector, the transmission band of the connector is inadequate and therefore gives rise to (stepped) waveform distortion of the image signal.

The above-described problem of inadequate transmission band that accompanies higher resolutions is not limited to the option slot connector. For example, in a display device that incorporates the functions of an option board, the function circuits and processing circuits that process the signals from the function circuits and supply the result to the display unit are electrically connected by way of transmission lines (wiring patterns), and the above-described problem of (stepped) distortion therefore occurs due to insufficient band of the transmission path.

In addition, because the higher resolutions of display devices can only be expected to improve in the future, the above-described inadequacy of connectors and transmission path will become a more serious problem.

It is an object of the present invention to provide a display system, a display device, an electronic apparatus, and an image signal transmission method that enable processing of high-resolution image signals and thus solve the above-described problem.

To achieve the above-described object, a display system according to an aspect of the present invention is a display system that includes a display device and an electronic apparatus that is electrically connected to the display device by way of a connector, wherein the electronic apparatus receives or generates an original image signal that indicates an original image that is to be displayed and supplies a plurality of divided image signals that indicate respective images of a plurality of partial images obtained by dividing the original image; and the display device displays the original image on the basis of a combined image signal obtained by combining the plurality of divided image signals that are supplied from the electronic apparatus.

According to another aspect of the present invention, a display device is provided that is electrically connected by way of a connector to an electronic apparatus that receives or generates an original image signal that indicates an original image that is to be displayed and supplies a plurality of divided image signals that each indicate a respective image of a plurality of partial images obtained by dividing the original image; wherein the display device includes: an image combining unit that combines the plurality of divided image signals that are supplied from the electronic apparatus to supply a combined image signal that indicates the original image, and a display unit that displays the original image on the basis of the combined image signal.

According to yet another aspect of the present invention, a display device is provided that includes an image-dividing unit that supplies a plurality of divided image signals in which the transmission formats mutually differ and that each indicate a respective image of a plurality of partial images obtained by dividing an original image that is to be displayed; an image-combining unit that combines the plurality of divided image signals that are supplied from the image-dividing unit to supply a combined image signal that indicates the original image; and a display unit that displays the original image on the basis of the combined image signal.

According to yet another aspect of the present invention, an electronic apparatus is provided that is electrically connected to a display device by way of a connector and that receives or generates an original image signal that indicates an original image that is to be displayed and transmits to the display device by way of the connector a plurality of divided image signals that each indicate respective images of a plurality of partial images obtained by dividing the original image.

According to another aspect of the present invention, an image signal transmission method is provided that is carried out in a display system that has a display device and an electronic apparatus that is electrically connected by way of a connector to the display device, the image signal transmission method including: the electronic apparatus receiving or generating an original image signal that indicates an original image that is to be displayed and supplying a plurality of divided image signals that each indicate a respective image of a plurality of partial images obtained by dividing the original image; and the display device displaying the original image on the basis of a combined image signal realized by combining the plurality of divided image signals that are supplied from the electronic apparatus.

EXAMPLE EMBODIMENT

Example embodiments of the present invention are next described with reference to the accompanying drawings.
(First Example Embodiment)

Figure 1:
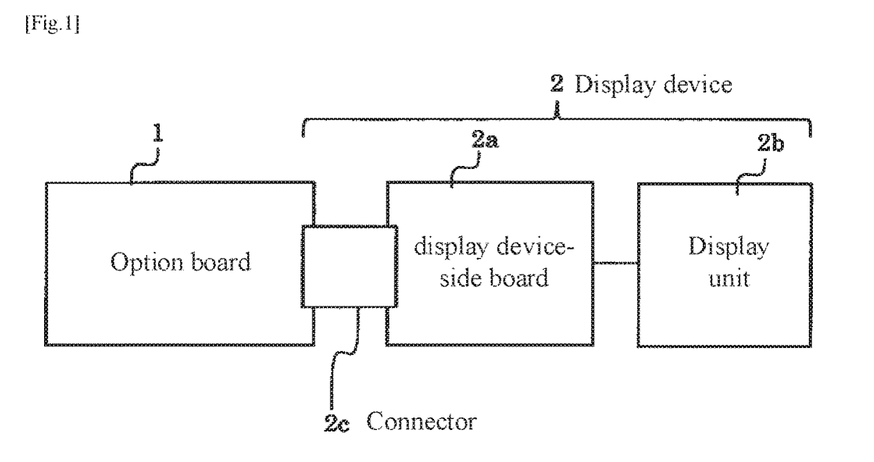
FIG. 1 is a block diagram showing the principal configuration of a display system that is the first example embodiment of the present invention.

FIG. 1 is a block diagram showing the principal configuration of the display system according to the first example embodiment of the present invention.

Referring to FIG. 1, the display system includes option board 1 (an electronic apparatus) and display device 2. Display device 2 is a digital display such as a liquid crystal display, and includes display device-side board 2a, display unit 2b, and connector 2c.

Connector 2c is a connector of an option slot. By inserting option board 1 into the option slot, option board 1 is electrically connected to display device-side board 2a by way of connector 2c. Display unit 2b is, for example, a liquid crystal panel.

Option board 1 has an image-dividing unit that takes as input a first image signal that indicates a first image (original image), divides the first image into a plurality of partial images, and supplies the plurality of divided image signals that each indicate a respective image of the partial images. The plurality of divided image signals may be signals of the same transmission format, or each of the divided signals may have a different transmission format. Image signals having mutually different transmission formats are, for example, signals transmitted using HDMI (High-Definition Multimedia Interface) or signals transmitted using a display port.

HDMI (Registered Trademark) is a standard specification of a communication interface for transmitting video/audio by digital signals. In HDMI, a video signal and a clock signal are transmitted separately. On the other hand, a display port is a standard of a digital video output interface that is designed for a digital display device such as a liquid crystal display. In this display port, data (video/audio) is packetized and transmitted. In this case, a clock is generated from the data without the use of an external clock.

Display device-side board 2a includes an image-combining unit that combines the plurality of divided image signals that were supplied from option board 1 to supply a second image signal that indicates a second image that corresponds to the first image. Display unit 2b displays the second image on the basis of the second image signal.

According to the above-described display system, option board 1 divides an image signal into a plurality of divided image signals, and the divided image signals are each parallel-transmitted to display device-side board 2a by way of connector 2c. Because the frequency of each divided image signal is decreased by half compared to the image signal that precedes division in this case, the frequency of the signal that passes through connector 2c can be reduced, whereby the influence upon an image signal caused by inadequate band of connector 2c can be prevented.

The actual configurations of option board 1 and display device-side board 2a are next described. In the following explanation, a state in which an image is divided into two, either vertically or horizontally, will be described as an example.

Figure 2:
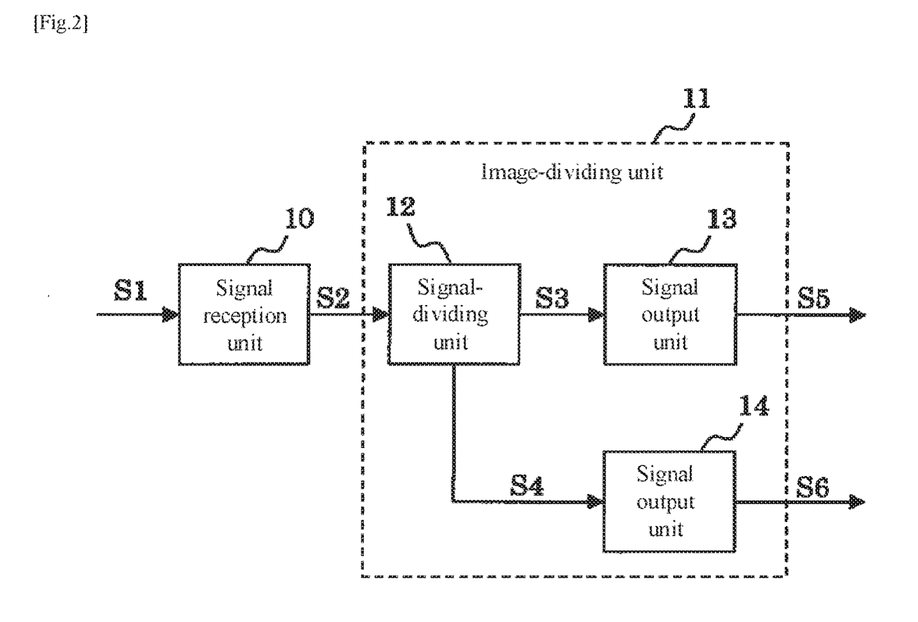
FIG. 2 is a block diagram showing an example of the configuration of an option board of the display system shown in FIG. 1.
Figure 3:
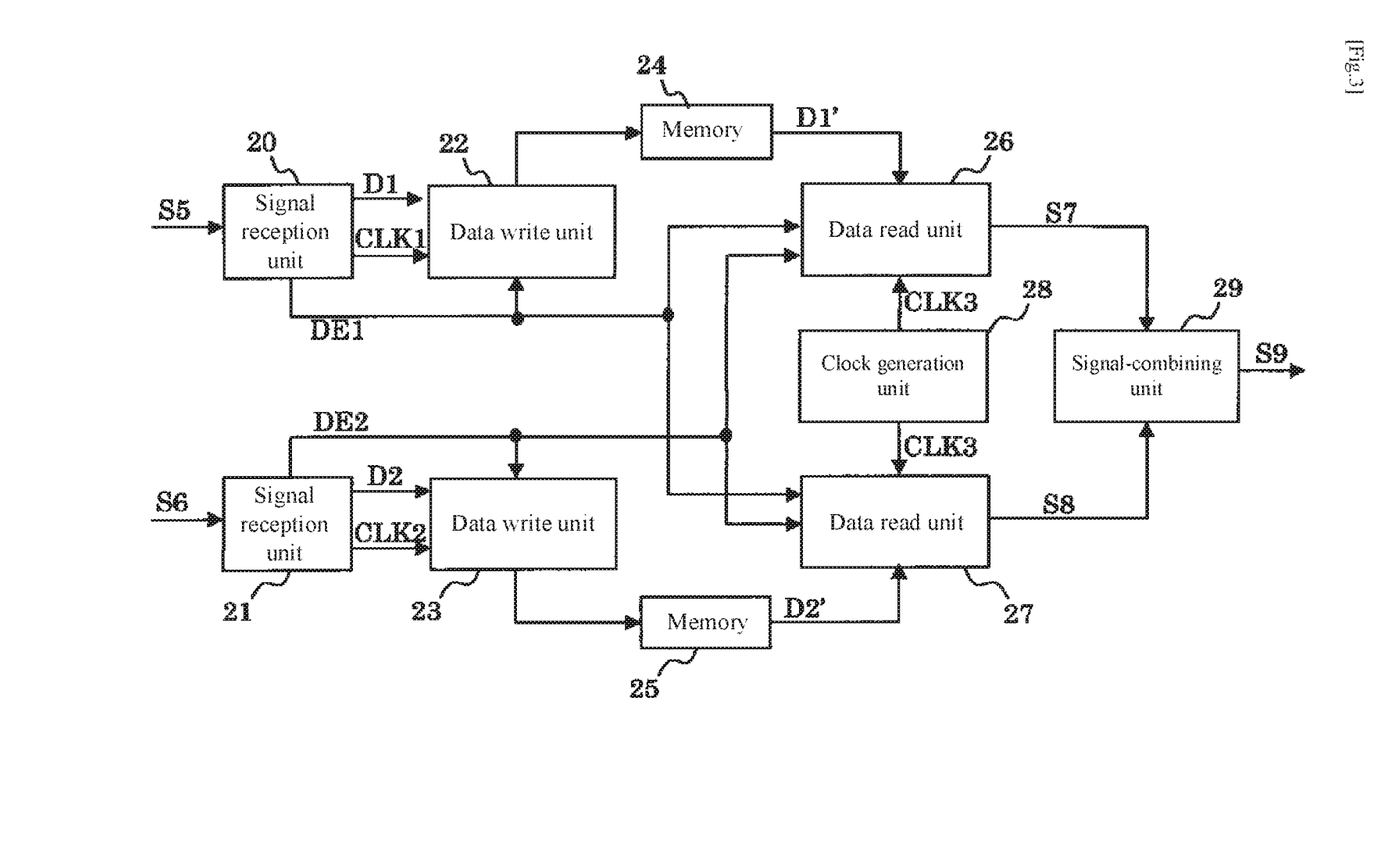
FIG. 3 is a block diagram showing an example of the configuration of the image-combining unit of the display device-side board of the display system shown in FIG. 1.

FIG. 2 shows an example of the configuration of option board 1, and FIG. 3 shows an example of the configuration of the image-combining unit of display device-side board 2a.

As shown in FIG. 2, option board 1 includes signal reception unit 10 and image-dividing unit 11. Image-dividing unit 11 includes signal-dividing unit 12 and signal output units 13 and 14.

Signal reception unit 10 receives image signal S1 from an outside device such as a personal computer or media player. Signal reception unit 10 supplies image signal S2 realized by converting image signal S1 to a format that is easily processed (a dedicated format or existing format) to signal-dividing unit 12.

Signal-dividing unit 12 divides the image indicated by image signal S2 into first and second partial images, supplies image signal S3 that indicates the first partial image to signal output unit 13, and supplies image signal S4 that indicates the second partial image to signal output unit 14. Signal-dividing unit 12 may divide the image into two vertically or may divide the image into two horizontally.

Signal output unit 13 supplies image signal S5 obtained by converting image signal S3 to a format that is to be transmitted. Signal output unit 14 supplies image signal S6 that is realized by converting image signal S4 to format that is to be transmitted. Here, the format that is to be transmitted is a transmission format such as HDMI or a display port. Signal output units 13 and 14 may use the same transmission format, or may use mutually differing transmission formats.

As shown in FIG. 3, display device-side board 2a includes: signal reception units 20 and 21, data write units 22 and 23, memories 24 and 25, data read units 26 and 27, clock generation unit 28, and signal-combining unit 29.

Signal reception unit 20 receives image signal S5 from option board 1 by way of connector 2c, and converts image signal S5 to a format suitable for writing to memory. Signal reception unit 20 supplies data D1 that indicates a first partial image, clock CLK1 for sampling data D1, and Data Enable signal DE1 that indicates the write timing for writing data D1 to memory 24 to data write unit 22. Data Enable signal DE1 is also supplied to data read units 26 and 27.

For example, when image signal S5 is an HDMI signal transmitted in the HDMI transmission format, clock CLK1 may be a clock contained in the HDMI signal. When image signal S5 is a display port signal that is transmitted in the display port transmission format, signal reception unit 20 generates clock CLK1 that is synchronized to the display port signal.

Signal reception unit 21 receives image signal S6 from option board 1 by way of connector 2c, and converts image signal S6 to a format suitable for writing to memory. Signal reception unit 21 supplies data D2 that indicates a second partial image, clock CLK2 for sampling data D2, and Data Enable signal DE2 that indicates the write timing for writing data D2 to memory 25 to data write unit 23. Data Enable signal DE2 is also supplied to data read units 26 and 27.

For example, when image signal S6 is an HDMI signal, clock CLK2 may be a clock that is contained in the HDMI signal. When image signal S6 is a display port signal, signal reception unit 21 generates clock CLK2 that is synchronized to the display port signal.

Data write unit 22 samples data D1 at clock CLK1, and writes the sampled data to memory 24 at the write timing that is indicated by Data Enable signal DE1. Data write unit 23 samples data D2 at clock CLK2, and writes the sampled data to memory 25 at the write timing that is indicated by Data Enable signal DE2. Memories 24 and 25 are, for example, semiconductor memories.

Clock generation unit 28 generates clock CLK3. Clock generation unit 28 supplies clock CLK3 to data read units 26 and 27. The frequency of clocks CLK1-CLK3 is preferably identical.

Of Data Enable signals DE1 and DE2, data read unit 26 uses the Data Enable signal having the later signal waveform rise timing as the Data Enable signal for reading data. Data read unit 26 reads data D1' from memory 24 in synchronization with clock CLK3 at the rise timing of the Data Enable signal for reading data. Data read unit 26 supplies image signal S7 that indicates data D1' to signal-combining unit 29.

Of Data Enable signal DE1 and DE2, data read unit 27 uses the Data Enable signal having the later signal waveform rise timing as the Data Enable signal for reading data. Data read unit 27 reads data D2' from memory 25 in synchronization with clock CLK3 at the rise timing of the Data Enable signal for reading data. Data read unit 27 supplies image signal S8 that indicates data D2' to signal-combining unit 29.

Signal-combining unit 29 combines image signal S7 (data D1') and image signal S8 (data D2') and supplies image signal S9 that indicates the combined image corresponding to the original image (the image indicated by image signal S2). For example, when data D1' is data of the left half of the original image, and data D2' is data of the right half of the original image, signal-combining unit 29 supplies image signal S9 that indicates a combined image in which these data D1' and D2' of left and right are joined together. Image signal S9 is supplied to display unit 2 shown in FIG. 1. Display unit 2 displays an image on the basis of image signal S9.

When data D1 and D1' are each data of the left half of the original image, and data D2 and D2' are each data of the right half of the original image, data D1' and D2' can be read from memories 24 and 25 while data D1 and D2 are written to memories 24 and 25. On the other hand, when data D1 and D1' are each data of the upper half of the original image and data D2 and D2' are each data of the lower half of the original image, data D1' is read from memory 24 after data D1 and D2 have been written to memories 24 and 25, following which data D2' is read from memory 25. Processing of the former case is faster than processing of the latter case.

By means of option board 1 and display device-side board 2a described hereinabove, in addition to the reduction of frequency resulting from the division of the image, phase adjustment becomes possible when combining the divided image signals.

When described with greater specificity, in the image division in signal-dividing unit 12 and the data format conversion in signal output units 13 and 14, phase shift may occur due to delay between divided image signals S5 and S6 (data D1 and D2). If this phase shift is not corrected, accurate image combining becomes problematic.

The use of the same clock CLK3 in the reading of data D1' and D2' from memories 24 and 25 by data read units 26 and 27 in display device-side board 2a (clock conversion) enables the synchronized acquisition of data D1' and D2' by signal-combining unit 29. In addition, the use of the later Data Enable signal of Data Enable signals DE1 and DE2 by data read units 26 and 27 in reading of data D1' and D2' from memories 24 and 25 (Data Enable signal adjustment) enables alignment of data D1' and D2' to the phase of the later Data Enable signal. In this way, signal-combining unit 29 is able to accurately combine the original image on the basis of data D1' and D2'.

Figure 4:
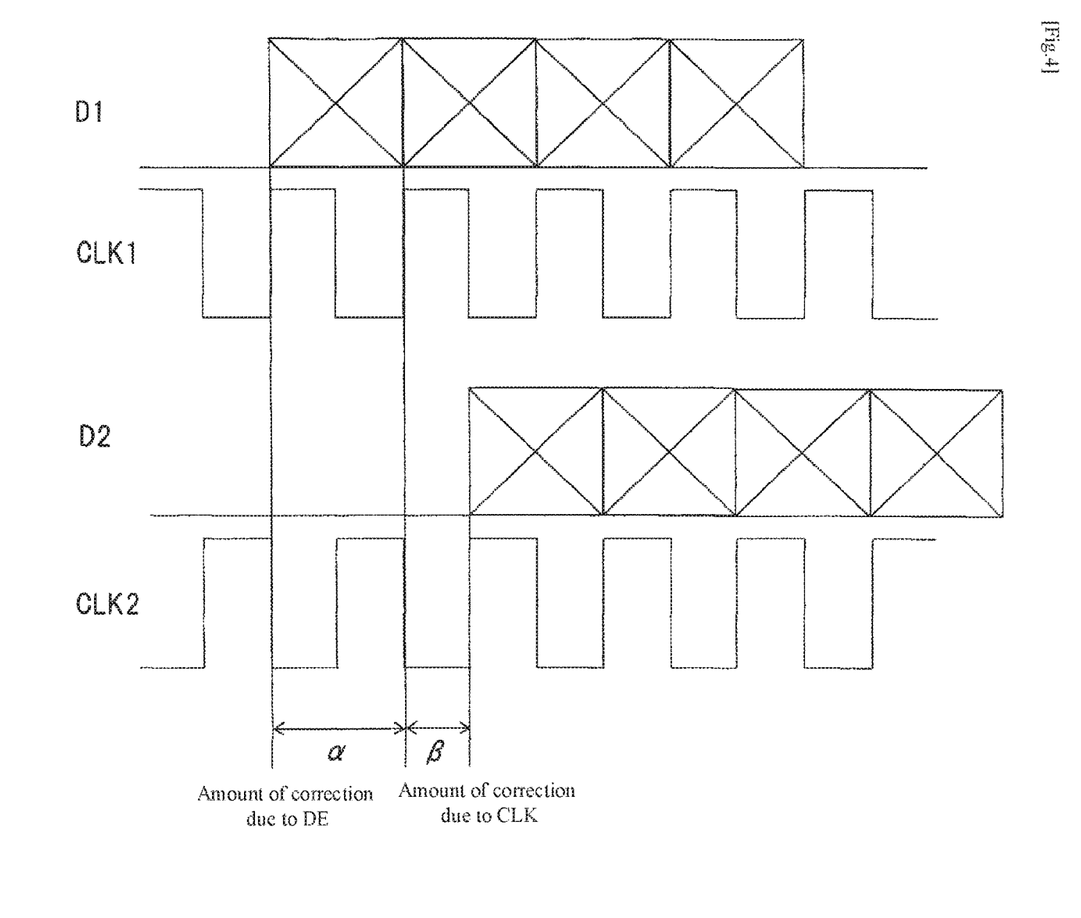
FIG. 4 is a view for describing an example of the data phase adjustment carried out in the display system shown in FIG. 1.

FIG. 4 gives a schematic representation of the correction resulting from clock conversion and Data Enable signal adjustment when a phase shift that exceeds one pixel occurs between data D1 and D2.

As shown in FIG. 4, data D1 is written to memory 24 in synchronization with clock CLK1 and data D2 is written to memory 25 in synchronization with clock CLK2. A phase shift of 1.5 clocks (1.5 pixel) occurs between data D1 and D2. Of this phase shift of 1.5 clocks, the phase shift $\beta$ of a 0.5 clock portion is corrected by carrying out clock conversion, and the phase shift $\alpha$ of the 1.0 clock portion is corrected by carrying out Data Enable signal adjustment.

Figure 5:
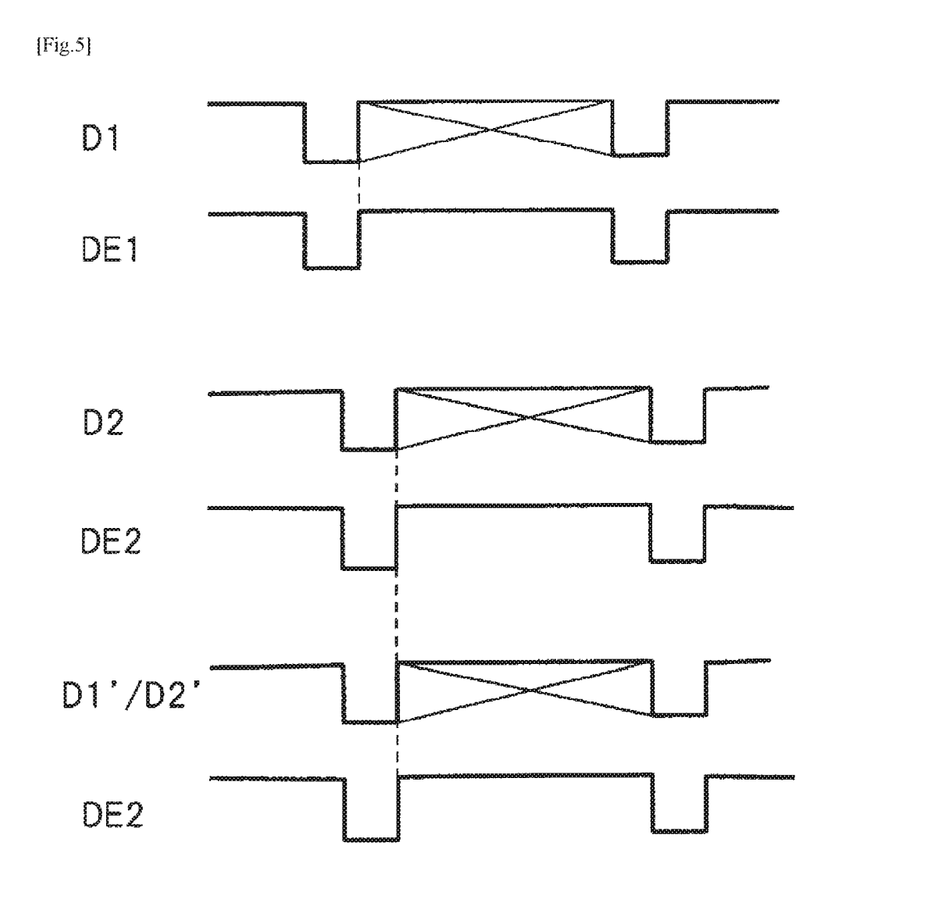
FIG. 5 is a timing chart for describing the data writing operation and data reading operation carried out in the display system shown in FIG. 1.

FIG. 5 gives a schematic representation of the phase correction that uses the later Data Enable signal DE2 of Data Enable signals DE1 and DE2. As shown in FIG. 5, using Data Enable signal DE2 to read data D1' and D2' enables alignment of data D1' and D2' to the phase of Data Enable signal DE2.

The display system described above is merely an example of the present invention, and the configuration and operation of the system are open to alteration as appropriate. For example, modifications may be made as shown below.

Although data read units 26 and 27 are configured to use the slower of Data Enable signals DE1 and DE2 to read data D1' and D2' from memories 24 and 25, the present invention is not limited to this form. Data read units 26 and 27 may also use a Data Enable signal of a timing that is later than both Data Enable signals DE1 and DE2 to read data D1' and D2' from memories 24 and 25. In this way, the reading of data D1' and D2' from memories 24 and 25 can be executed while maintaining sufficient margin with respect to the timing of writing data D1 and D2 to memories 24 and 25.

A first set of signal output unit 13 and signal reception unit 20 and a second set of signal output unit 14 and signal reception unit 21 may together be taken as a structure corresponding to HDMI. In this case, due to the synchronization of both of clocks CLK1 and CLK2 with the clock of the HDMI signal, phase shift may occur in pixel units but phase shift within one pixel is impeded. As a result, Data Enable signal adjustment is effective.

The above-described first and second sets may also together be taken as a construction corresponding to a display port. In this case, clocks CLK1 and CLK2 are not synchronized, and as a result, phase shift within one pixel may occur. For example, phase shift of a 0.5-pixel portion or a 1.5-pixel portion may occur. As a result, clock conversion and Data Enable signal adjustment are effective.

One of the above-described first and second sets may be taken as a construction corresponding to HDMI and the other taken as a construction corresponding to a display port. In this case as well, because a phase shift within one pixel may occur, clock conversion and Data Enable signal adjustment are effective.

In option board 1, a signal-generating unit that generates image signal S2 may be provided in place of signal reception unit 10.

Further, in option board 1, signal-generating units that respectively generate one of two image signals corresponding to divided image signals S3 and S4 may be provided in place of signal reception unit 10 and signal-dividing unit 12.

(Second Example Embodiment)

Figure 6:
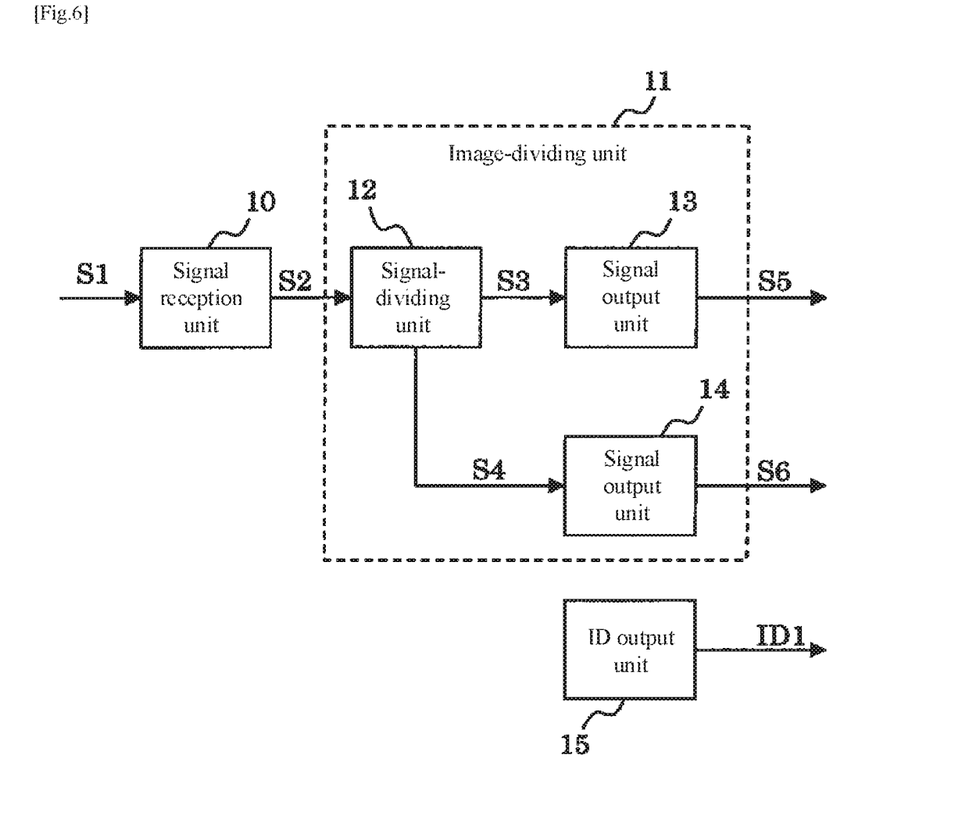
FIG. 6 is a block diagram showing an example of the configuration of the option board of the display system that is the second example embodiment of the present invention.

A display system according to the second example embodiment of the present invention includes option board 1 and display device 2 as in the first example embodiment but differs from the first example embodiment in that display device-side board 2a recognizes option board 1. FIG. 6 shows the configuration of option board 1 and FIG. 7 shows the configuration of display device-side board 2a.

As shown in FIG. 6, option board 1 includes, in addition to the configuration shown in FIG. 2, ID output unit 15 (identification information output unit) that supplies an ID signal (identification information) that is information for identifying option board 1. The ID signal supplied from ID output unit 15 is supplied to display device-side board 2a by way of connector 2c.

Figure 7:
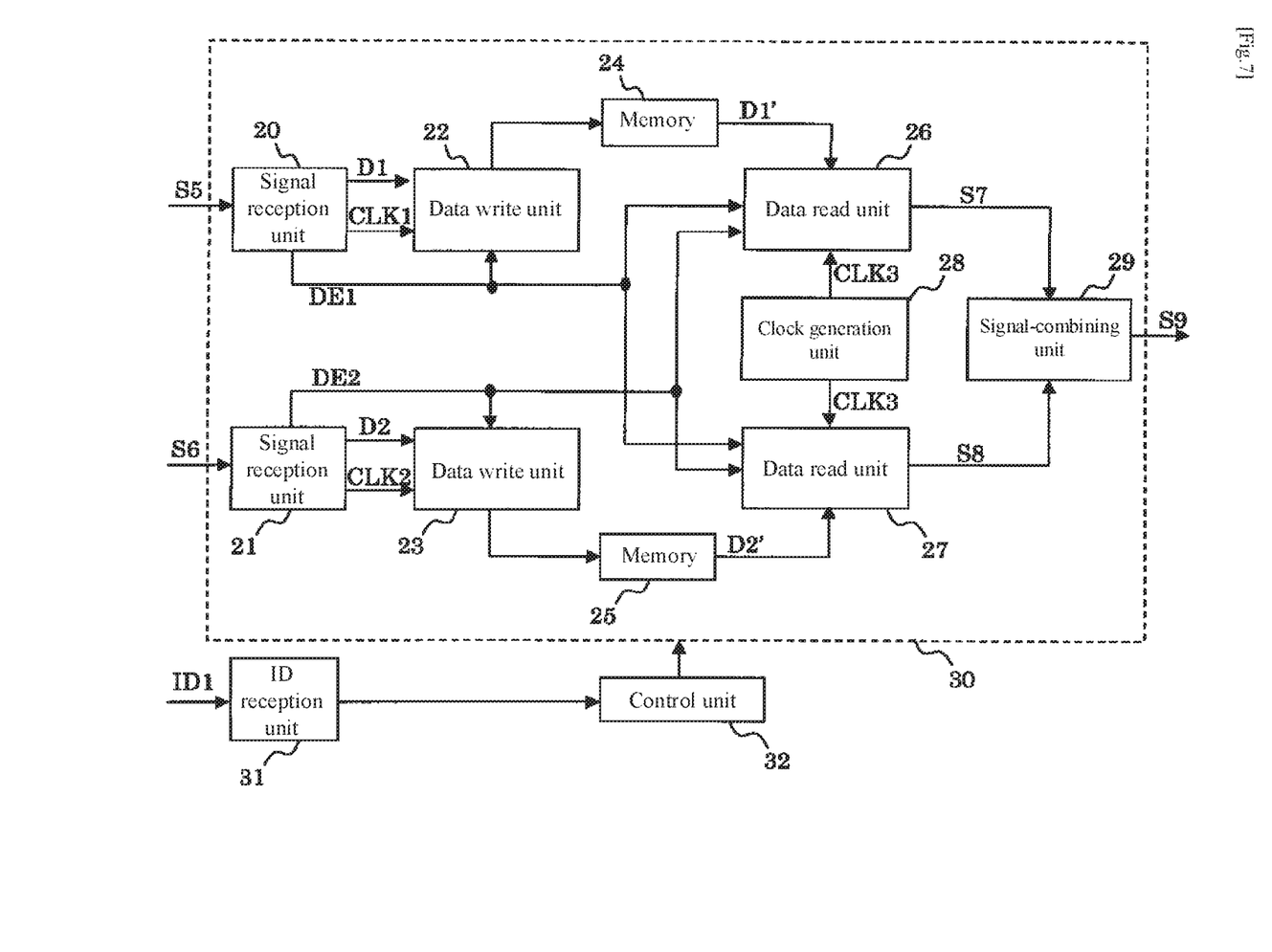
FIG. 7 is a block diagram showing an example of the configuration of the image-combining unit of the display device-side board of the display system that is the second example embodiment of the present invention.

As shown in FIG. 7, display device-side board 2a includes image-combining unit 30, ID reception unit 31, and control unit 32 that is made of by a CPU. Image-combining unit 30 includes the configuration shown in FIG. 3.

ID reception unit 31 is electrically connected to ID output unit 15 by way of connector 2c and receives an ID signal from ID output unit 15. ID reception unit 31 supplies the ID signal to control unit 32. Control unit 32 recognizes option board 1 on the basis of the ID signal and controls the operation of image-combining unit 30.

For example, control unit 32 judges whether option board 1 is the construction shown in FIG. 2 on the basis of the ID signal. Control unit 32 causes the implementation of the image combining operation by image-combining unit 30 only when option board 1 is the construction indicated in FIG. 2. When option board 1 is not the construction shown in FIG. 2, control unit 32 displays a predetermined message (for example, a message indicating an incompatible option board) on display unit 2b.

According to the display system of the present example embodiment, in addition to the effects described in the first example embodiment, the compatibility/incompatibility of an option board can be determined.

In addition, when signal reception units 20 and 21 of display device-side board 2a are both constructions that can be switched between HDMI/display port, control unit 32 may carry out control as shown below on the basis of the ID signal.

When option board 1 in which signal reception units 20 and 21 both correspond to HDMI is connected to display device-side board 2a by way of connector 2c, control unit 32 recognizes option board 1 on the basis of the ID signal. Control unit 32 that has recognized option board 1 sets both signal reception units 20 and 21 to HDMI.

When option board 1 in which signal output units 13 and 14 both correspond to a display port is connected to display device-side board 2a by way of connector 2c, control unit 32 recognizes option board 1 on the basis of the ID signal. Control unit 32 that has recognized option board 1 sets both signal reception units 20 and 21 to display port.

When option board 1 in which signal output unit 13 is HDMI-compatible and signal output unit 14 is display port-compatible is connected to display device-side board 2a by way of connector 2c, control unit 32 recognizes option board 1 on the basis of the ID signal. Control unit 32 that has recognized option board 1 sets signal reception unit 20 to HDMI and sets signal reception unit 21 to display port.

When option board 1 in which signal output unit 13 is display port-compatible and signal output unit 14 is HDMI-compatible is connected to display device-side board 2a by way of connector 2c, control unit 32 recognizes option board 1 on the basis of the ID signal. Control unit 32 that has recognized option board 1 sets signal reception unit 20 to display port and sets signal reception unit 21 to HDMI.

By means of the configuration described above, an option board having HDMI compatibility or display port compatibility can be used, whereby convenience is enhanced.

In the display system of the present example embodiment as well, modifications such as were described in the first example embodiment can be applied.

(Other Example Embodiments)

A display device according to another example embodiment of the present invention incorporates an image-dividing unit that is provided with functions that correspond to option board 1, and apart from this image-dividing unit, includes display device-side board 2a and display unit 2c as described in the first example embodiment. The image-dividing unit and display device-side board 2a are electrically connected by way of a transmission path (wiring) and not by way of connector 2c. The image-dividing unit and display device-side board 2a may be formed on the same board or may be formed on different boards.

The operation of the image-dividing unit is the same as option board 1 described in the first example embodiment. The operation of display device-side board 2a and display unit 2b is also as described in the first example embodiment, and the operation is therefore here described simply.

The image-dividing unit receives a first image signal that indicates a first image from an outside device such as a personal computer. The image-dividing unit divides the first image into a plurality of partial images and supplies to display device-side board 2a a plurality of divided image signals that each indicate a respective image of the partial images in mutually different transmission formats.

Display device-side board 2a includes an image-combining unit that combines the plurality of divided image signals that were supplied from the image-dividing unit and that supplies a second image signal that indicates a second image that corresponds to the first image. Display unit 2b displays the second image on the basis of the second image signal.

The display device of this other example embodiment exhibits the following action and effects.

Upon supplying the first image signal of high resolution without alteration to display device-side board 2a, (stepped) distortion of the waveform of the image signal may occur due to inadequacy of the transmission band of the transmission path.

The image-dividing unit divides the first image signal into a plurality of divided image signals and each divided image signal is parallel-transferred to display device-side board 2a. Because the frequency of each divided image signal is reduced by half compared to the image signal that precedes division in this case, the frequency of the signal that passes over the transmission path can be decreased, with the result that the effect upon the image signal caused by inadequacy of the band of the transmission path can be reduced.

The modification that was described in the first example embodiment can also be applied in the display device of this other example embodiment.

In each of the example embodiments described above, the partial images may also include partial images that are used in interlacing.

In each of the example embodiments, moreover, an image of high resolution can be displayed using the PbP (Picture by Picture) display function that is provided in a display device by dividing an original image into two images vertically or horizontally.

Still further, in the first and second example embodiments, when a configuration is adopted in which a plurality of divided image signals are supplied in mutually different transmission formats, the problem of inadequacy of the transmission band can be solved by using a standardized connector.

In the first and second example embodiments, moreover, loss of the connector in the frequency of divided image signals is less than the loss of a connector in the frequency of the original image signal. As a result, the use of divided image signals can prevent the effect of the connector upon the image signal. The same can be said regarding the loss of the transmission path in the other example embodiments.

The present invention can adopt forms such as shown in the following SUPPLEMENTARY NOTES 1-30 but is not limited to these forms.

[Supplementary Note 1]

A display system comprising:
a display device; and
an electronic apparatus that is electrically connected to the display device by way of a connector, wherein:
the electronic apparatus receives or generates an original image signal that indicates an original image that is to be displayed and supplies a plurality of divided image signals that indicate respective images of a plurality of partial images obtained by dividing the original image; and
the display device displays the original image on the basis of a combined image signal obtained by combining the plurality of divided image signals that are supplied from the electronic apparatus.

[Supplementary Note 2]

The display system as described in Supplementary Note 1, wherein loss of the connector in the frequency of the plurality of divided image signals is less than loss of the connector in the frequency of the original image signal.

[Supplementary Note 3]

The display system as described in Supplementary Note 1 or 2, wherein the electronic apparatus supplies the plurality of divided image signals in mutually different transmission formats.

[Supplementary Note 4]

The display system as described in Supplementary Note 1 or 2, wherein the electronic apparatus supplies the plurality of divided image signals in the same transmission format.

[Supplementary Note 5]

The display system as described in any one of Supplementary Notes 1 to 4, wherein:
the electronic apparatus supplies a first divided image signal that indicates one partial image of two partial images obtained by dividing the original image either vertically or horizontally and a second divided image signal that indicates the other partial image; and
the display device combines the first and second divided image signals to supply a combined image signal that indicates the original image.

[Supplementary Note 6]

The display system as described in Supplementary Note 5, wherein:
the display device includes:
a first memory into which is written first data that indicates one of the partial images that is indicated by the first divided image signal;
a second memory into which is written second data that indicates the other of the partial images that is indicated by the second divided image signal;
a first data read unit that reads the first data from the first memory; and
a second data read unit that reads the second data from the second memory,
wherein the first and second data read units use the same clock signal to perform reading of the first and second data from the first and second memories.

[Supplementary Note 7]

The display system as described in Supplementary Note 6, wherein:
the display device further includes:
a first signal reception unit that receives the first divided image signal from the electronic apparatus and supplies as output each of the first data, a first clock signal, and a first Data Enable signal;
a second signal reception unit that receives the second divided image signal from the electronic apparatus and supplies as output each of the second data, a second clock signal of the same frequency as the first clock signal, and a second Data Enable signal;
a first data write unit that, at a write timing indicated by the first Data Enable signal, writes the first data to the first memory in synchronization with the first clock signal;
a second data write unit that, at a write timing indicated by the second Data Enable signal, writes the second data to the second memory in synchronization with the second clock signal; and
a clock generation unit that supplies a third clock signal of the same frequency as the first or second clock signal,
wherein each of the first and second data read units uses, of the first and the second Data Enable signals, the Data Enable signal having the later timing or a Data Enable signal having a later timing than both the first and second Data Enable signal to read data on the basis of the third clock signal from the corresponding memory of the first and second memories at a read timing that is indicated by the Data Enable signal.

[Supplementary Note 8]

The display system as described in any one of Supplementary Notes 1 to 7, wherein:

the electronic apparatus further includes an identification information output unit that supplies identification information that identifies the electronic apparatus; and the display device further includes a control unit that recognizes the electronic apparatus on the basis of the identification information and controls the operation of combining the plurality of divided image signals.

[Supplementary Note 9]

A display device that is electrically connected by way of a connector to an electronic apparatus that receives or generates an original image signal that indicates an original image that is to be displayed and supplies a plurality of divided image signals that each indicate a respective image of a plurality of partial images obtained by dividing the original image, the display device including:

an image combining unit that combines the plurality of divided image signals that are supplied from the electronic apparatus to supply a combined image signal that indicates the original image; and a display unit that displays the original image on the basis of the combined image signal.

[Supplementary Note 10]

The display device as described in Supplementary Note 9, wherein loss of the connector in the frequency of the plurality of divided image signals is less than the loss of the connector in the frequency of the original image signal.

[Supplementary Note 11]

The display device as described in Supplementary Note 9 or 10, wherein the image-combining unit combines the plurality of divided image signals that are supplied in mutually different transmission formats from the electronic apparatus to supply a combined image signal that indicates the original image.

[Supplementary Note 12]

The display device as described in Supplementary Note 9 or 10, wherein the image-combining unit combines the plurality of divided image signals that are supplied in the same transmission format from the electronic apparatus to supply a combined image signal that indicates the original image.

[Supplementary Note 13]

The display device as described in any one of Supplementary Notes 9 to 12, wherein:

the plurality of divided image signals contains a first divided image signal that indicates one partial image of two partial images obtained by dividing the original image vertically or horizontally and a second divided image signal that indicates the other partial image; and the image-combining unit combines the first and second divided image signals to supply a combined image signal that indicates the original image.

[Supplementary Note 14]

The display device as described in Supplementary Note 13, wherein:

the image-combining unit includes:

a first memory into which is written first data that indicates the one partial image that is indicated by the first divided image signal;

a second memory into which is written second data that indicates the other partial image that is indicated by the second divided image signal;

a first data read unit that reads the first data from the first memory; and a second data read unit that reads the second data from the second memory, wherein the first and second data read units use the same clock signal to perform reading of the first and second data from the first and second memories.

[Supplementary Note 15]

The display device as described in Supplementary Note 14, wherein:

the image-combining unit further includes:

a first signal reception unit that receives the first divided image signal from the electronic apparatus and supplies as output each of the first data, a first clock signal, and a first Data Enable signal;

a second signal reception unit that receives the second divided image signal from the electronic apparatus and supplies as output each of the second data, a second clock signal of the same frequency as the first clock signal, and a second Data Enable signal;

a first data write unit that, at a write timing that is indicated by the first Data Enable signal, writes the first data to the first memory in synchronization with the first clock signal; a second data write unit that, at a write timing that is indicated by the second Data Enable signal, writes the second data to the second memory in synchronization with the second clock signal; and a clock generation unit that supplies a third clock signal of the same frequency as the first or second clock signal, wherein each of the first and second data read units uses, of the first and second Data Enable signals, the Data Enable signal having the later timing or uses a Data Enable signal having later timing than both the first and second Data Enable signals to read data on the basis of the third clock signal from the corresponding memory of the first and second memories at a read timing that is indicated by the Data Enable signal.

[Supplementary Note 16]

The display device as described in any one of Supplementary Notes 9 to 15, wherein the display device further includes:

a reception unit that receives from the electronic apparatus identification information that identifies the electronic apparatus; and a control unit that recognizes the electronic apparatus on the basis of the identification information and controls the operation of combining the plurality of divided image signals.

[Supplementary Note 17]

A display device includes:

an image-dividing unit that supplies a plurality of divided image signals in which the transmission format mutually differs and that each indicate a respective image of a plurality of partial images obtained by dividing an original image that is to be displayed;

an image-combining unit that combines the plurality of divided image signals that are supplied from the image-dividing unit to supply a combined image signal that indicates the original image; and a display unit that displays the original image on the basis of the combined image signal.

[Supplementary Note 18]

The display device as described in Supplementary Note 17, wherein the image-dividing unit and the image-combining unit are formed on the same board.

[Supplementary Note 19]

An electronic apparatus that is electrically connected to a display device by way of a connector, the electronic apparatus being configured to receive or generate an original image signal that indicates an original image that is to be displayed and to transmit to the display device by way of the connector a plurality of divided image signals that indicate respective images of a plurality of partial images obtained by dividing the original image.

[Supplementary Note 20]

The electronic apparatus as described in Supplementary Note 19, wherein the frequency of any of the plurality of divided image signals is lower than the frequency of the original image signal.

[Supplementary Note 21]

The electronic apparatus as described in Supplementary Note 19 or 20, wherein the plurality of divided image signals are transmitted to the display device in mutually different transmission formats.

[Supplementary Note 22]

The electronic apparatus as described in any one of Supplementary Notes 19 to 21 further including an identification information output unit that transmits to the display device by way of the connector identification information that identifies the electronic apparatus.

[Supplementary Note 23]

An image signal transmission method that is carried out in a display system that includes a display device and an electronic apparatus that is electrically connected by way of a connector to the display device, the method including:

the electronic apparatus receiving or generating an original image signal that indicates an original image that is to be displayed and supplying a plurality of divided image signals that each indicate a respective image of a plurality of partial images obtained by dividing the original image; and the display device displaying the original image on the basis of a combined image signal realized by combining the plurality of divided image signals that are supplied from the electronic apparatus.

[Supplementary Note 24]

The image signal transmission method as described in Supplementary Note 23, wherein loss of the connector in the frequency of the plurality of divided image signals is less than the loss of the connector in the frequency of the original image signal.

[Supplementary Note 25]

The image signal transmission method as described in Supplementary Note 23 or 24, further including the electronic apparatus supplying the plurality of divided image signals in mutually different transmission formats.

[Supplementary Note 26]

The image signal transmission method as described in Supplementary Note 23 or 24, further including the electronic apparatus supplying the plurality of divided image signals in the same transmission format.

[Supplementary Note 27]

The image signal transmission method as described in any one of Supplementary Notes 23 to 26, further including:

the electronic apparatus supplying a first divided image signal that indicates one partial image of two partial images realized by dividing the original image vertically or horizontally and a second divided image signal that indicates the other partial image; and the display device combining the first and second divided image signals to supply a combined image signal that indicates the original image.

[Supplementary Note 28]

The image signal transmission method as described in Note 27, further including the display device writing the first data that indicates the one partial image that is indicated by the first divided image signal into the first memory, writing the second data that indicates the other partial image that is indicated by the second divided image signal into the second memory, and using the same clock signal to read the first and second data from the first and second memories.

[Supplementary Note 29]

The image signal transmission method as described in Note 28, further including the display device:

receiving the first divided image signal from the electronic apparatus and supplying as output each of the first data, a first clock signal, and a first Data Enable signal;

receiving the second divided image signal from the electronic apparatus and supplying as output each of the second data, a second clock signal of the same frequency as the first clock signal, and a second Data Enable signal;

at a write timing indicated by the first Data Enable signal, writing the first data into the first memory in synchronization with the first clock signal;

at a write timing indicated by the second Data Enable signal, writing the second data into the second memory in synchronization with the second clock signal; and using, of the first and second Data Enable signals, the Data Enable signal having the later timing or using a Data Enable signal for which the timing is later than both the first and second Data Enable signals to read data from the corresponding memory of the first and second memories on the basis of a third clock signal of frequency that is the same as the first or the second clock signal at a read timing that is indicated by the Data Enable signal.

[Supplementary Note 30]

The image signal transmission method as described in any one of Notes 23 to 29, further including:

the electronic apparatus supplying identification information that identifies the electronic apparatus; and the display device recognizing the electronic apparatus on the basis of the identification information and controlling the operation of combining the plurality of divided image signals.

EXPLANATION OF REFERENCE NUMBERS

1 option board
2 display device
2a display device-side board 2a
2b display unit
2c connector
10 signal reception unit
11 image-dividing unit
12 signal-dividing unit
13, 14 signal output unit
20, 21 signal reception unit
22, 23 data write unit
24, 25 memory
26, 27 data read unit
28 clock generation unit
29 signal-combining unit

What is claimed is:

1. A display system, comprising:
a display device; and
an electronic apparatus that is electrically connected to said display device a connector,
wherein said electronic apparatus receives or generates an original image signal that indicates an original image that is to be displayed and supplies a plurality of divided image signals that indicate respective images of a plurality of partial images obtained by dividing said original image, wherein said display device displays said original image on a basis of a combined image signal obtained by combining said plurality of divided image signals that are supplied from said electronic apparatus, wherein said electronic apparatus supplies a first divided image signal that indicates a first partial image of two partial images obtained by dividing said original image either vertically or horizontally, and a second divided image signal that indicates a second partial image of the two partial images, wherein said display device combines said first and second divided image signals to supply a combined image signal that indicates said original image, wherein said display device comprises:
- a first memory into which is written first data that indicates said first partial image that is indicated by said first divided image signal;
- a second memory into which is written second data that indicates said second partial image that is indicated by said second divided image signal;
- a first memory input circuit that reads said first data from said first memory;
- a second memory input circuit that reads said second data from said second memory, wherein said first and second memory input circuits use a same clock signal to perform reading of said first and second data from said first and second memories;
- a first signal receiver circuit that receives said first divided image signal from said electronic apparatus and supplies as output each of said first data, a first clock signal, and a first Data Enable signal;
- a second signal receiver circuit that receives said second divided image signal from said electronic apparatus and supplies as output each of said second data, a second clock signal of a same frequency as said first clock signal, and a second Data Enable signal;
- a first memory input circuit that, at a write timing indicated by said first Data Enable signal, writes said first data to said first memory in synchronization with said first clock signal;
- a second memory input circuit that, at a write timing indicated by said second Data Enable signal, writes said second data to said second memory in synchronization with said second clock signal; and
- a clock generation circuit that supplies a third clock signal of a same frequency as said first or second clock signal, and wherein each of said first and second memory input circuits uses, of said first and said second Data Enable signals, the Data Enable signal having the later timing or a Data Enable signal having a later timing than both said first and second Data Enable signal to read data on the basis of said third clock signal from, of said first and second memories, a corresponding memory at a read timing that is indicated by the Data Enable signal.

2. The display system as set forth in claim 1, wherein a loss of said connector in a frequency of said plurality of divided image signals is less than a loss of said connector in a frequency of said original image.

3. The display system as set forth in claim 1, wherein said electronic apparatus supplies each of said plurality of divided image signals in a different transmission format.

4. The display system as set forth in claim 1, wherein said electronic apparatus supplies said plurality of divided image signals in a same transmission format.

5. The display system as set forth in claim 1, wherein said electronic apparatus further comprises an identification information output circuit that supplies identification information that identifies said electronic apparatus, and wherein said display device further comprises a control circuit that recognizes said electronic apparatus on a basis of said identification information and controls an operation of combining said plurality of divided image signals.

6. A display device that is electrically connected by a connector to an electronic apparatus that receives or generates an original image signal that indicates an original image that is to be displayed and supplies a plurality of divided image signals that each indicate a respective image of a plurality of partial images obtained by dividing said original image, said display device comprising:

- an image combining circuit that combines said plurality of divided image signals that are supplied from said electronic apparatus to supply a combined image signal that indicates the original image; and
- a display circuit that displays the original image on a basis of said combined image signal, wherein said plurality of divided image signals includes a first divided image signal that indicates a first partial image of two partial images obtained by dividing said original image vertically or horizontally, and a second divided image signal that indicates a second partial image of the two partial images, wherein said image-combining circuit combines said first and second divided image signals to supply a combined image signal that indicates said original image, wherein said image-combining circuit comprises:
- a first memory into which is written first data that indicates said first partial image that is indicated by said first divided image signal;
- a second memory into which is written second data that indicates said second partial image that is indicated by said second divided image signal;
- a first memory input circuit that reads said first data from said first memory; and
- a second memory input circuit that reads said second data from said second memory, wherein said first and second memory input circuits use a same clock signal to perform reading of said first and second data from said first and second memories,
- a first signal receiver circuit that receives said first divided image signal from said electronic apparatus and supplies as output each of said first data, a first clock signal, and a first Data Enable signal;
- a second signal receiver circuit that receives said second divided image signal from said electronic apparatus and supplies as output each of said second data, a second clock signal of a same frequency as said first clock signal, and a second Data Enable signal;
- a first memory input circuit that, at a write timing that is indicated by said first Data Enable signal, writes said first data to said first memory in synchronization with said first clock signal;
- a second memory input circuit that, at a write timing that is indicated by said second Data Enable signal, writes said second data to said second memory in synchronization with said second clock signal; and a clock generation circuit that supplies a third clock signal of a same frequency as said first or second clock signal, and wherein each of said first and second memory input circuits uses, of said first and second Data Enable signals, the Data Enable signal having the later timing or uses a Data Enable signal having later timing than both said first and second Data Enable signals to read data on the basis of said third clock signal from the corresponding memory of said first and second memories at a read timing that is indicated by the Data Enable signal.

7. The display device as set forth in claim 6, wherein a loss of said connector in a frequency of said plurality of divided image signals is less than a loss of said connector in a frequency of said original image signal.

8. The display device as set forth in claim 6, wherein said image-combining circuit combines said plurality of divided image signals, each of said plurality of divided image signals being supplied in a different transmission format from said electronic apparatus to supply a combined image signal that indicates said original image.

9. The display device as set forth in claim 6, wherein said plurality of divided image signals are supplied from said electronic apparatus in a same transmission format.

10. The display device as set forth in claim 6, wherein said display device further comprises:
    a receiver circuit that receives from said electronic apparatus identification information that identifies that electronic apparatus; and
    a control circuit that recognizes said electronic apparatus on a basis of said identification information and controls the operation of combining said plurality of divided image signals.

11. A display device, comprising:
    an image-dividing circuit that supplies a plurality of divided image signals, each of the plurality of divided image signals indicating a respective image of a plurality of partial images obtained by dividing an original image that is to be displayed, each of the plurality of divided image signals having a different transmission format;
    an image-combining circuit that combines said plurality of divided image signals that are supplied from said image-dividing circuit to supply a combined image signal that indicates said original image; and
    a display circuit that displays said original image on a basis of said combined image signal,
    wherein said plurality of divided image signals includes a first divided image signal that indicates a first partial image of two partial images obtained by dividing said original image vertically or horizontally, and a second divided image signal that indicates a second partial image of the two partial images,
    wherein said image-combining circuit combines said first and second divided image signals to supply a combined image signal that indicates said original image,
    wherein said image-combining circuit comprises:
        a first memory into which is written first data that indicates said first partial image that is indicated by said first divided image signal;
        a second memory into which is written second data that indicates said second partial image that is indicated by said second divided image signal;
        a first memory input circuit that reads said first data from said first memory; and
        a second memory input circuit that reads said second data from said second memory, wherein said first and second memory input circuits use a same clock signal to perform reading of said first and second data from said first and second memories,
        a first signal receiver circuit that receives said first divided image signal from said electronic apparatus and supplies as output each of said first data, a first clock signal, and a first Data Enable signal;
        a second signal receiver circuit that receives said second divided image signal from said electronic apparatus and supplies as output each of said second data, a second clock signal of a same frequency as said first dock signal, and a second Data Enable signal;
        a first memory input circuit that, at a write timing that is indicated by said first Data Enable signal, writes said first data to said first memory in synchronization with said first clock signal;
        a second memory input circuit that, at a write timing that is indicated by said second Data Enable signal, writes said second data to said second memory in synchronization with said second clock signal; and
        a clock generation circuit that supplies a third clock signal of a same frequency as said first or second clock signal, and
    wherein each of said first and second memory input circuits uses, of said first and second Data Enable signals, the Data Enable signal having the later timing or uses a Data Enable signal having later timing than both said first and second Data Enable signals to read data on the basis of said third clock signal from the corresponding memory of said first and second memories at a read timing that is indicated by the Data Enable signal.

12. The display device as set forth in claim 11, wherein said image-dividing circuit and said image-combining circuit are formed on a same board.

13. An electronic apparatus that is electrically connected to a display device by a connector, said electronic apparatus being configured to receive or generate an original image signal that indicates an original image that is to be displayed and to transmit a plurality of divided image signals that indicate respective images of a plurality of partial images obtained by dividing said original image to said display device by the connector,
    wherein said display device displays said original image on a basis of a combined image signal obtained by combining said plurality of divided image signals that are supplied from said electronic apparatus,
    wherein said electronic apparatus supplies a first divided image signal that indicates a first partial image of two partial images obtained by dividing said original image either vertically or horizontally, and a second divided image signal that indicates a second partial image of the two partial images,
    wherein said display device combines said first and second divided image signals to supply a combined image signal that indicates said original image,
    wherein said display device comprises:
        a first memory into which is written first data that indicates said first partial image that is indicated by said first divided image signal;
        a second memory into which is written second data that indicates said second partial image that is indicated by said second divided image signal;
        a first memory input circuit that reads said first data from said first memory;

a second memory input circuit that reads said second data from said second memory, wherein said first and second memory input circuits use a same clock signal to perform reading of said first and second data from said first and second memories;

a first signal receiver circuit that receives said first divided image signal from said electronic apparatus and supplies as output each of said first data, a first clock signal, and a first Data Enable signal;

a second signal receiver circuit that receives said second divided image signal from said electronic apparatus and supplies as output each of said second data, a second clock signal of a same frequency as said first clock signal, and a second Data Enable signal;

a first memory input circuit that, at a write timing indicated by said first Data Enable signal, writes said first data to said first memory in synchronization with said first clock signal;

a second memory input circuit that, at a write timing indicated by said second Data Enable signal, writes said second data to said second memory in synchronization with said second clock signal; and a clock generation circuit that supplies a third clock signal of a same frequency as said first or second clock signal, and wherein each of said first and second memory input circuits uses, of said first and said second Data Enable signals, the Data Enable signal having the later timing or a Data Enable signal having a later timing than both said first and second Data Enable signal to read data on the basis of said third clock signal from, of said first and second memories, a corresponding memory at a read timing that is indicated by the Data Enable signal.

14. The electronic apparatus as set forth in claim 13, wherein a frequency of each of said plurality of divided image signals is lower than a frequency of said original image signal.

15. The electronic apparatus as set forth in claim 13, wherein each of said plurality of divided image signals, supplied from said electronic apparatus, is supplied to said display device using a different transmission format.

16. An image signal transmission method that is carried out in a display system that includes a display device and an electronic apparatus that is electrically connected by a connector to said display device, said method comprising:

said electronic apparatus receiving or generating an original image signal that indicates an original image that is to be displayed and supplying a plurality of divided image signals that each indicate a respective image of a plurality of partial images obtained by dividing said original image; and said display device displaying said original image on a basis of a combined image signal realized by combining said plurality of divided image signals that are supplied from said electronic apparatus, wherein said electronic apparatus supplies a first divided image signal that indicates a first partial image of two partial images obtained by dividing said original image either vertically or horizontally, and a second divided image signal that indicates a second partial image of the two partial images, wherein said display device combines said first and second divided image signals to supply a combined image signal that indicates said original image, wherein said display device comprises:

a first memory into which is written first data that indicates said first partial image that is indicated by said first divided image signal;

a second memory into which is written second data that indicates said second partial image that is indicated by said second divided image signal;

a first memory input circuit that reads said first data from said first memory;

a second memory input circuit that reads said second data from said second memory, wherein said first and second memory input circuits use a same clock signal to perform reading of said first and second data from said first and second memories;

a first signal receiver circuit that receives said first divided image signal from said electronic apparatus and supplies as output each of said first data, a first clock signal, and a first Data Enable signal;

a second signal receiver circuit that receives said second divided image signal from said electronic apparatus and supplies as output each of said second data, a second clock signal of a same frequency as said first clock signal, and a second Data Enable signal;

a first memory input circuit that, at a write timing indicated by said first Data Enable signal, writes said first data to said first memory in synchronization with said first clock signal;

a second memory input circuit that, at a write timing indicated by said second Data Enable signal, writes said second data to said second memory in synchronization with said second clock signal; and a clock generation circuit that supplies a third clock signal of a same frequency as said first or second clock signal, and wherein each of said first and second memory input circuits uses, of said first and said second Data Enable signals, the Data Enable signal having the later timing or a Data Enable signal having a later timing than both said first and second Data Enable signal to read data on the basis of said third clock signal from, of said first and second memories, a corresponding memory at a read timing that is indicated by the Data Enable signal.

* * * * *